United States Patent
Shibayama et al.

[11] Patent Number: 5,645,356
[45] Date of Patent: Jul. 8, 1997

[54] BUSH AND INTEGRAL SEAL

[75] Inventors: Takayuki Shibayama; Masatoshi Inoue, both of Nagoya, Japan

[73] Assignee: Daido Metal Company Ltd., Nagoya, Japan

[21] Appl. No.: 499,496

[22] Filed: Jul. 7, 1995

[30] Foreign Application Priority Data

Jul. 18, 1994 [JP] Japan .................. 6-188839

[51] Int. Cl.[6] .................................................. F16C 33/74
[52] U.S. Cl. ................................................ 384/138; 384/130
[58] Field of Search .................................. 384/138, 130, 384/140, 215, 295, 296, 428

[56] References Cited

U.S. PATENT DOCUMENTS

| | | |
|---|---|---|
| 2,283,424 | 5/1942 | Colwell et al. |
| 2,766,084 | 7/1956 | Fisher . |
| 3,330,605 | 7/1967 | Jasmand ............... 384/138 X |
| 3,527,507 | 9/1970 | Clark et al. ............ 384/130 X |
| 4,190,299 | 2/1980 | Brown ..................... 384/130 |
| 4,280,741 | 7/1981 | Stoll ..................... 384/130 X |
| 5,217,309 | 6/1993 | Csermak et al. ............ 384/130 |
| 5,352,044 | 10/1994 | Jordans et al. ........... 384/295 X |

FOREIGN PATENT DOCUMENTS

| | | |
|---|---|---|
| 815730 | 7/1949 | Germany . |
| 2406361 | 2/1974 | Germany . |
| 8130556.7 | 10/1981 | Germany . |
| 4010802A1 | 4/1990 | Germany . |
| 55-181064 | 12/1980 | Japan . |

*Primary Examiner*—Thomas R. Hannon
*Attorney, Agent, or Firm*—Browdy and Neimark

[57] ABSTRACT

A rotary shaft is supported by a bearing surface of a bush body. The diameter of the rotary shaft is slightly smaller than that of the bearing surface of the bush body, thus defining a clearance therebetween. On both end sides of the bush body, seal portions elastically engage with the peripheral surface of the rotary shaft, and the outer surfaces of the seal portions extend within a range of thickness of the bush body so that end surfaces of the bush body and end surfaces of the seal portions are in contact with each other. Consequently, both sides of the clearance are sealed by inside surfaces of the seal portions.

14 Claims, 3 Drawing Sheets

BUSH AND INTEGRAL SEAL

FIELD OF THE INVENTION

The present invention relates to a bush which rotatably supports a rotary shaft, and a method of manufacturing the same.

BACKGROUND OF THE INVENTION

As shown in FIG. 5, a bush 50 of a bearing, especially of a dry bearing, has a cylindrical shape, and the inner surface of the bush 50 serves as a bearing surface 51 having a good sliding-contact property. The bush 50 is fixed on the inner surface of a housing H, and rotatably supports a rotary shaft S inserted in the bearing surface 51.

The rotary shaft S supported by the bearing surface 51 of the bush 50 has a diameter slightly smaller than an inner diameter of the bearing surface 51 so that the rotary shaft S rotates smoothly, and a clearance δ exists between the rotary shaft S and the bearing surface 51 of the bush 50. Consequently, if foreign matters such as dust enter into the clearance δ from the outside, they will damage the bearing surface 51. In order to prevent foreign matters from entering into the clearance, conventionally, seal rings 52 are attached to both ends of the bush 50 so as to seal the clearance δ.

Also, in an invention disclosed in JP-U-55-181064, seal rings are secured on a rotary shaft, to thereby seal the clearance δ.

In those conventional ways, however, sealing is effected with the seal rings 52 which are separate members attached to both sides of the bush 50. Therefore, an extra cost is required in producing such separate seal ring 52, and also, there arises a problem that assembling operation of the rotary shaft S to the bush is rather complicated.

SUMMARY OF THE INVENTION

Thus, it is an object of the present invention to provide a bush with a self sealing function of preventing foreign matters from entering into a clearance between the bush and a rotary shaft which is supported by the bush.

According to a first feature of the invention, as is stated in claim 1, there is provided a bush comprising: a cylindrical bush body; and seal portions provided on both opposite side ends of the bush body in connection therewith, the seal portions extending from the bush body in the circumferential direction and being curved more inwardly than the bush body by such a degree that the outer peripheral surfaces of the seal portions still stay within a wall thickness range of the bush body.

More particularly, the first feature is set out as follows: A cylindrical bush for supporting a rotary shaft with a small clearance therebetween, comprising seal pieces which extend circumferentially and are in contact with both opposite end surfaces of the bush and a peripheral surface of the rotary shaft so as to prevent foreign matters from entering into the clearance between the bush and the rotary shaft, wherein each of said seal pieces is integrally formed with a bush body as two seal portions, having an annular shape and being separated at one part in the circumferential direction, respectively, and wherein the respective seal portion is continuous to the bush body at an intermediate region between the opposite ends of the seal portion in the circumferential direction, and has an inner diameter smaller than that of the bush body and has an outer diameter smaller than that of the bush body but larger than the inner diameter of the bush body.

According to a second feature of the invention, as is stated in claim 2, there is provided a bush which has a body slit extending in the axial direction of the bush body to divide the bush body at circumferential one part.

According to a third feature of the invention, as is stated in claim 3, there is provided a method of manufacturing a bush, comprising the steps of: partially dividing a rectangular plate material from the opposite outer ends to form cuts extending inwardly along both the lateral side ends of the plate material to form four narrow tablet sections; bending a primary center portion of the plate material into a cylindrical shape of a bush body; and bending also the tablet sections to form two seal portions like as the primary center portion such that the respective seal portion still stays within a wall thickness range of the bush body.

More particularly, the third feature is set out as follows: A method of manufacturing a cylindrical bush, comprising the steps of: partially shearing a rectangular plate material from a first pair of opposite side ends toward each other in such a manner that a pair of said shearing lines are formed parallel along each of a second pair of opposite second side ends and extend close to and in parallel to said second pair of side ends, and that the respective pair of shearing lines in parallel to each of said second pair of side ends are located at an equal distance from said respective second pair of side ends but not continuous to each other; bending a primary center portion of the plate material between the first pair of opposite side ends except for four narrow tablet sections formed in parallel to said second pair of side ends by the above shearing so that a cylindrical bush body is formed; and bending also said four tablet sections to form two seal portions, wherein said cylindrical bush comprises the cylindrical bush body for supporting a rotary shaft with a small clearance formed therebetween, and the seal portions which extend from the bush body in the circumferential direction and are in contact with both opposite end surfaces of the bush body and a peripheral surface of the rotary shaft so as to prevent foreign matters from entering into the clearance between the bush body and the rotary shaft, in which each of said seal portions is integrally formed with the bush body, the respective seal portion having an annular shape is separated at one part in the circumferential direction, and wherein the respective seal portion is continuous to the bush body at an intermediate position between the opposite ends of the seal portion in the circumferential direction, and has an inner diameter smaller than that of the bush body and an outer diameter smaller than that of the bush body but larger than the inner diameter of the bush body.

According to a fourth feature of the invention, as is stated in claim 4, there is provided a bearing structure comprising: a housing; a cylindrical bush body fixedly mounted in the housing; and a rotary shaft rotatably supported by the bush body, wherein seal portions provided on both opposite side ends of the bush body extend from the bush body in the circumferential direction and are curved more inwardly than the bush body such that the outer peripheral surfaces of the seal portions still stay within a wall thickness range of the bush body, and the seal portions elastically engage with the peripheral surface of the rotary shaft.

More particularly, the fourth feature is set out as follows:

A bearing structure comprising: a housing; a cylindrical bush fixedly mounted in the housing; and a rotary shaft rotatably supported by the cylindrical bush, wherein said cylindrical bush comprises a bush body and a pair of seal portions which extend from the bush body in the circumferential direction and elastically contact with both opposite end surfaces of the bush body and a peripheral surface of the rotary shaft so as to prevent foreign matters from entering into the clearance between the bush body and the rotary shaft, in which each of said two seal portions is integrally formed with the bush body as one portion of said cylindrical bush, the respective seal portion having an annular shape is separated at one part in the circumferential direction and continuous to the bush body at an intermediate position between the opposite ends of the seal portion in the circumferential direction, and wherein the respective seal portion has an inner diameter smaller than that of the bush body and an outer diameter smaller than that of the bush body but larger than the inner diameter of the bush body.

According to the first feature of the invention, the rotary shaft is supported by the inner-peripheral surface of the bush body, and the diameter of the rotary shaft is slightly smaller than that of the inner surface of the bush body, thus defining a clearance δ therebetween. On both end sides of the bush body, the seal portions elastically engage with the peripheral surface of the rotary shaft, and the outer surfaces of the seal portions extend more inwardly within the range of thickness of the bush body, so that the clearance δ is sealed by inside ends of the seal portions.

According to the second feature, the bush body is divided by the body slit extending axially, so that the whole bush body is provided with elasticity and closely fitted in the housing owing to the elasticity.

In the method of manufacturing the bush according to the third feature, the rectangular plate material is partially divided from the opposite outer ends to form cuts extending inwardly along both the lateral sides of the plate material, and thereafter, the bush body and the seal portions are formed by bending the plate material, thereby facilitating the manufacture of the bush.

In the bearing structure according to the fourth feature, the cylindrical bush body is fixedly mounted on the inner surface of the housing, and the rotary shaft is supported by the bearing surface which is the inner surface of the bush body. The rotary shaft has the diameter which is slightly smaller than that of the bearing surface of the bush body, thereby defining the clearance δ between these two members. Further, the seal portions are provided on both opposite sides of the bush body, and curved more inwardly than the bush body by such a degree that the end edges of the outer surfaces of the seal portions stay within the range of thickness of the bush body. Therefore, both sides of the clearance δ between the bush body and the rotary shaft are sealed by side surfaces of the seal portions. Moreover, the seal portions elastically engage with the peripheral surface of the rotary shaft, to thereby seal the above-mentioned clearance δ. Even if the seal portions are worn as a result of long-time use, the tightly sealed state is maintained because the seal portions elastically engage with the peripheral surface of the rotary shaft.

In the bush according to the first feature, the seal portions are provided on both opposite sides of the bush body in connection therewith, and the seal portions are curved more inwardly than the bush body by such a degree that the end edges of the outer surfaces of the seal portions stay within the range of thickness of the bush body. Consequently, while the bush has a simple structure, it can prevent dust from entering therein.

In the bush according to the second feature, the bush body is divided by the body slit extending axially, so that the bush can be readily mounted in the inner surface of the housing due to the elasticity of the bush body.

In the method of manufacturing the bush according to the third feature, the rectangular plate material is partially divided from the opposite outer ends to form cuts extending inwardly along both the lateral sides of the plate material, and subsequently, the intermediate portion of the plate material is formed into the curved cylindrical shape of the bush body, and also, the seal portions are formed by bending the separated portions on both the lateral sides inwardly by such a degree that the end edges of the outer surfaces of the separated portions stay within the range of thickness of the bush body. That is to say, the bush can be easily manufactured by a partial separation process and a bending process of the rectangular plate material.

In the bearing structure according to the fourth feature, the seal portions provided on both opposite sides of the bush body extend from the bush body in the circumferential direction, and are curved more inwardly than the bush body by such a degree that the outer surfaces of the seal portions stay within the range of thickness of the bush body while the seal portions elastically engage with the peripheral surface of the rotary shaft. Therefore, the seal portions seal the clearance δ between the bush body and the rotary shaft so as to provide a bearing structure which can prevent foreign matters from entering therein.

DESCRIPTION OF THE PREFERRED EMBODIMENTS

A bearing structure which supports a rotary shaft $\underline{S}$ extending horizontally in one embodiment of the present invention will be hereinafter described with reference to FIGS. 1 to 3.

Figure 1:
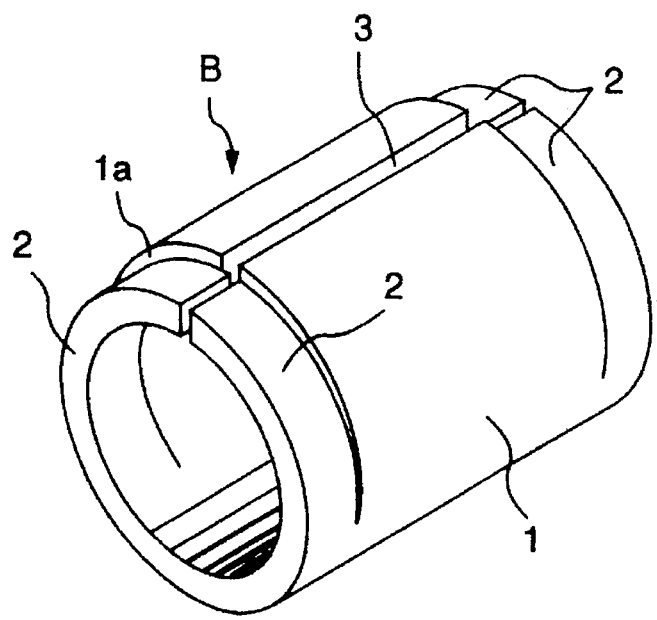
FIG. 1 is a perspective view of a bush.

As shown in FIG. 1, a bush $\underline{B}$ of this embodiment is formed by bending a rectangular thick plate into a cylindrical shape, and comprises a cylindrical bush body 1 and seal portions 2 which are provided on both sides of the bush body 1 in connection therewith.

Figure 2:
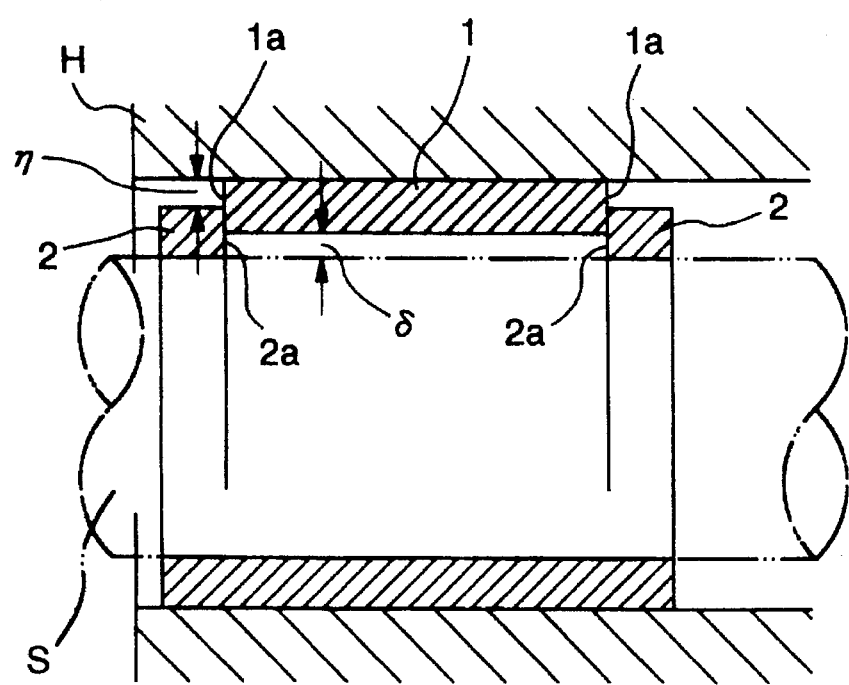
FIG. 2 is a cross-sectional view of the bush in a use.

As shown in FIGS. 1 and 2, the bush body 1 has a cylindrical shape such that a rotary shaft $\underline{S}$ can be rotatably supported inside of the bush body 1, and that the outer surface of the bush body 1 can be closely fitted to the inner surface of a housing $\underline{H}$. A body slit 3 is defined between the both opposite ends of the curved bush body 1. When inserted in the housing $\underline{H}$, the bush body 1 is decreased in diameter by narrowing the body slit 3, and elastically pressed against the inner-peripheral surface of the housing $\underline{H}$.

The seal portions 2 provided on both sides of the bush body 1 in connection therewith are those portions of the circumferential surface which are cut from the opposite ends of the bush body 1 over an angle of about 120° of the circumference. Lower parts of the seal portions 2 are continuously formed with the bush body 1 such that the seal portion of the bush is integral and unitary with the body portion of the bush. As seen in the drawing, the surfaces 2a and 1a are close set and define a cut plane that is generally flat and perpendicular to the axis of the bush. Inside surfaces 2a of the seal portions 2 are in contact with end surfaces 1a of the bush body 1. The seal portions 2 are curved slightly more inwardly than the bush body 1 so long as the inside surfaces 2a maintain contact with the end surfaces 1a, i.e., within a range of plate thickness of the bush body 1.

Consequently, as shown in FIG. 2, when inserted in the housing H, the bush body 1 which is an intermediate portion of the bush B is pressed against the inner-peripheral surface of the housing H due to elasticity of the whole bush body 1 whereas the seal portions 2 on both sides are curved inwardly by a degree corresponding to clearances η from the inner-peripheral surface of the housing H.

As is shown in FIGS. 1 and 2, the curved end seal portions (including the arms 2 that are separated from the body 1 by a cut) have inner cylindrical surfaces that define an end portion axis parallel to and coincident with the axis of the shaft S. The end portion axis is laterally offset from the body axis, which is parallel to and coincident with the axis of the bore in the housing H which holds the bush body 1.

The rotary shaft S inserted and supported in the bush B has a diameter which is about 0.025 to 0.050 mm smaller than an inner diameter of the bush body 1. Therefore, the rotary shaft S is rotatably supported in the bush B with a clearance δ being formed above the bush body 1. The seal portions 2, which are curved in such a manner that the diameter is smaller than the diameter of the rotary shaft S, are press-fitted on the peripheral surface of the rotary shaft S. Therefore, as shown in FIG. 2, even if dust enters into the clearances η from the outside, it can not further enter into the clearance δ because the end surfaces 1a of the bush body 1 and the inside surfaces 2a of the seal portions 2 are in contact with each other. Moreover, since the seal portions 2 are press-fitted on the peripheral surface of the rotary shaft S, dust can not enter through clearances between the peripheral surface of the rotary shaft S and the seal portions 2.

Figure 3:
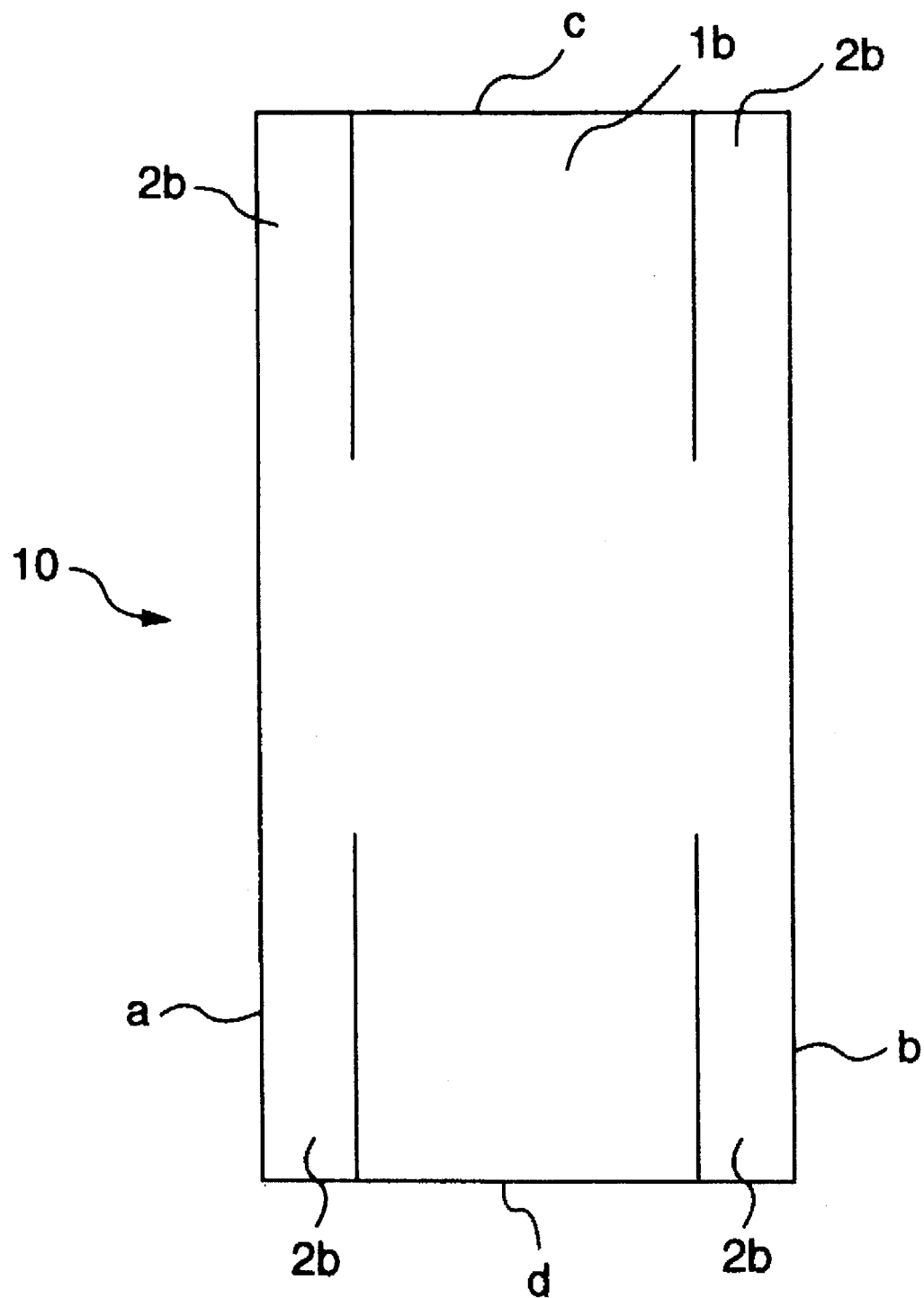
FIG. 3 is a plan view of a plate material for manufacturing the bush.

As shown in FIG. 3, the bush B of this embodiment is manufactured by press-cutting a length range of about ⅓ of the overall length between the both opposite ends c and d of the rectangular plate material 10 from the both opposite end c and d along the other both opposite ends a and b, so that cut portions 2b to serve as the seal portions 2 are formed on both sides of the plate material 10, thereby forming a body portion 1b to serve as the bush body 1 between the two cut portions 2b.

Subsequently, the whole plate material 10 is bent into a cylindrical shape. As a result, the both opposite ends c and d are opposed to each other to define the body slit 3 therebetween. The cut portions 2b are bent further inwardly so that, as shown in FIG. 1, the inside surfaces 2a of the seal portions 2 will be in contact with the end surfaces 1a of the bush body 1. Thus, the bush B of this embodiment can be manufactured through the cutting process and the bending process of the plate material 10 in substantially the same manner as the conventionally known bush manufacturing processes. Especially in the cutting process, a long material of a roll is cut into rectangular plates, and the cut portions 2b can be press-cut at the same time.

In order to fit the bush B into the housing H, the bush body 1 is decreased in diameter and inserted into a predetermined position in the housing H, and when released from the diameter-decreased state, the bush body 1 is increased in diameter due to its elasticity and elastically press-fitted against the inner surface of the housing H. At this time, the seal portions 2, which have a smaller diameter than the inner periphery of the housing H, do not hinder the bush B brought into the housing H.

When the rotary shaft S is inserted into the bush B, the seal portion 2 is opened by a chamfered end of the rotary shaft S though not shown. Therefore, the seal portions 2 do not hinder insertion of the rotary shaft S, and also, the seal portions 2 are maintained to be press-fitted on the peripheral surface of the rotary shaft S. Even if the seal portions 2 are worn during long-term use, no clearances are formed between the rotary shaft S and the seal portions 2 because the seal portions 2 are press-fitted on the rotary shaft S. In consequence, the seal portions 2 serve as a dust seal for a long period of time.

In this embodiment, the supported rotary shaft S extend horizontally. The same effects can be produced when the rotary shaft S extend vertically. More specifically, though the clearance δ is not formed in a predetermined position by the rotary shaft S, the seal portions 2 are press-fitted on the peripheral surface of the rotary shaft S, so that a clearance defined between the inner surface of the bush body 1 and the rotary shaft S can be sealed to prevent dust from entering into the clearance.

Further, in this embodiment, since the cut portions 2b are formed by press-cutting, the end surfaces 1a of the bush body 1 and the inside surfaces 2a of the seal portions 2 are in contact with each other. However, they need not be always in contact with each other, and small clearances may exist therebetween so long as dust can be prevented from entering.

Figure 4:
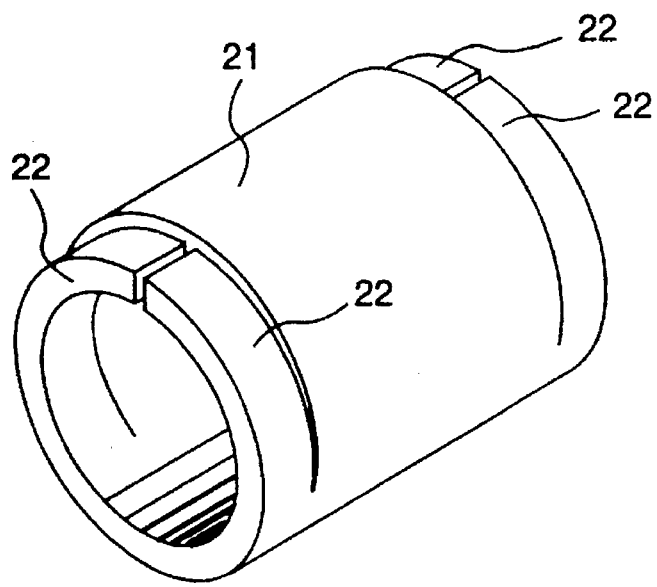
FIG. 4 is a perspective view of another embodiment.
Figure 5:
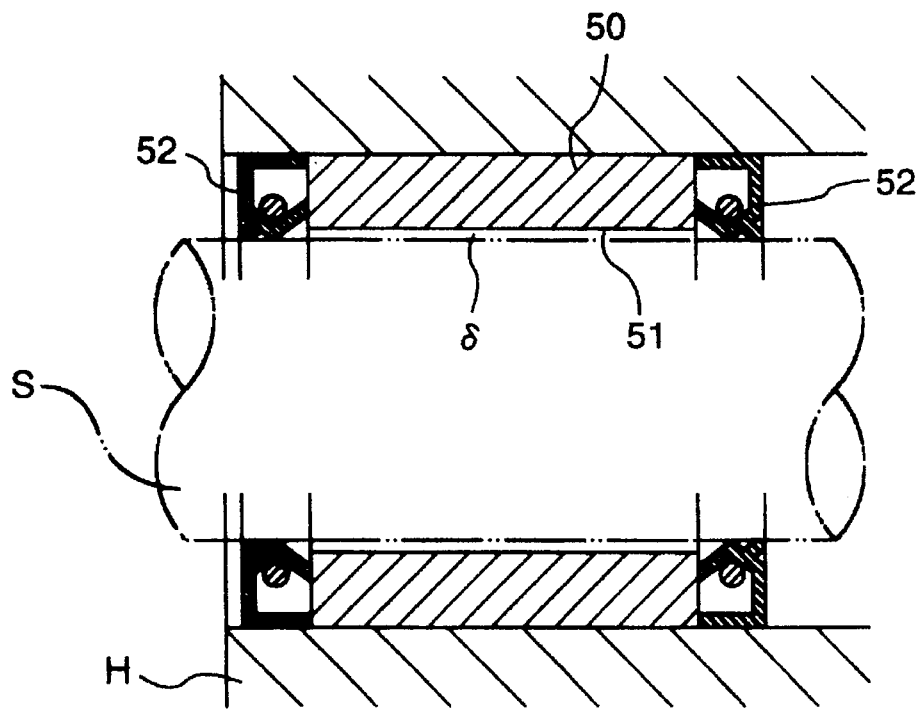
FIG. 5 is a cross-sectional view showing a conventional example.

Moreover, a so-called wrapped bush having the body slit 3 defined between the both opposite ends of the bush body 1 is described in this embodiment. However, as shown in FIG. 4, the invention can be applied to a bush comprising a cylindrical bush body 21 with no body slit 3, and seal portions 22 provided on both sides of the bush body 21.

What is claimed is:

1. A bush comprising:

a generally cylindrical body portion having a tubular wall with a plate thickness, a body axis, an inner body diameter, an outer body diameter, and two opposite ends along the body axis, each of the ends having a respective end surface; and a generally cylindrical seal portion at each of the opposite ends, each seal portion being integral and unitary with the body portion, each seal portion comprising an arm and a non-arm portion, the non-arm portion being continuous with the body portion and the arm;

the arm having an inner arm diameter less than the inner body diameter, and the arm having an outer arm diameter less than the outer body diameter and greater than the body inner diameter.

2. The bush according to claim 1, wherein the body portion includes a longitudinal body slit through the tubular wall.

3. The bush according to claim 2, wherein the arm does not intersect a projection of the longitudinal body slit.

4. The bush according to claim 1, wherein the arm includes an inside surface in contact with the end surface adjacent thereto.

5. The bush according to claim 1, wherein the arm defines an end portion axis parallel to and laterally offset from the body axis.

6. The bush according to claim 1, wherein the end surface defines a cut plane generally perpendicular to the body axis.

7. The bush according to claim 6, wherein the arm includes an inside surface in contact with the end surface adjacent thereto.

8. A bearing structure comprising:

(a) a housing including an inner housing diameter;

(b) a rotary shaft rotatably supported by the bush body and having a shaft diameter; and (c) a bush, mounted within the housing, comprising a generally cylindrical body portion having a tubular wall with a plate thickness, a body axis, an inner body diameter, an outer body diameter, and two opposite ends along the body axis, each of the ends having a respective end surface; and a generally cylindrical seal portion at each of the opposite ends, each seal portion being integral and unitary with the body portion, each seal portion comprising an arm and a non-arm portion, the non-arm portion being continuous with the body portion and the arm;

the arm having an inner arm diameter less than the inner body diameter, and the arm having an outer arm diameter less than the outer body diameter and greater than the body inner diameter.

9. The bearing structure according to claim 8, wherein the body portion includes a longitudinal body slit through the tubular wall.

10. The bearing structure according to claim 9, wherein the arm does not intersect a projection of the longitudinal body slit.

11. The bearing structure according to claim 8, wherein the arm includes an inside surface in contact with the end surface adjacent thereto.

12. The bearing structure according to claim 8, wherein the arm defines an end portion axis parallel to and laterally offset from the body axis.

13. The bearing structure according to claim 8, wherein the end surface defines a cut plane generally perpendicular to the body axis.

14. The bearing structure according to claim 13, wherein the arm includes an inside surface in contact with the end surface adjacent thereto.

* * * * *